(12) United States Patent
Dépault

(10) Patent No.: US 6,942,237 B1
(45) Date of Patent: Sep. 13, 2005

(54) HITCH ASSEMBLY

(76) Inventor: Marcel Dépault, 1875 rang St-Edouard, St-Simon-de-Bagot, Quebec (CA) J0H 1Y0

( * ) Notice: Subject to any disclaimer, the term of this patent is extended or adjusted under 35 U.S.C. 154(b) by 0 days.

(21) Appl. No.: 10/834,885

(22) Filed: Apr. 30, 2004

(51) Int. Cl.$^7$ ................................................ B60D 1/52
(52) U.S. Cl. ................................... 280/491.5; 280/482
(58) Field of Search ............................ 280/482, 491.5, 280/495

(56) References Cited

U.S. PATENT DOCUMENTS 2,873,982 A * 2/1959 Graham ................... 280/478.1
3,385,610 A * 5/1968 Vezina ....................... 280/482
4,050,714 A * 9/1977 Epp ........................... 280/495
4,266,800 A * 5/1981 Hawkins .................. 280/491.4
5,423,566 A * 6/1995 Warrington et al. ..... 280/415.1

FOREIGN PATENT DOCUMENTS

GB        2214148 A * 8/1989 ............ B60D 1/14

* cited by examiner

*Primary Examiner*—Kevin Hurley
(74) *Attorney, Agent, or Firm*—Ogilvy Renault

(57) ABSTRACT

A hitch assembly comprises a mounting bracket defining a horizontal through for receiving a drawbar. A pin projects downwards into the through for engagement in a pin slot defined in the drawbar. A wedge is axially insertable into the through for wedging the drawbar therein. A fastener is provided for releasably securing the wedge to the mounting bracket.

16 Claims, 3 Drawing Sheets

HITCH ASSEMBLY

BACKGROUND OF THE INVENTION

1. Field of the Invention

The present invention relates to a hitch assembly for attachment to a conventional drawbar of a towing vehicle with a pin slot providing a more rigid support over rough terrain.

2. Prior Art

A conventional towing hitch comprises a towing ball member and a fastener. Typically, in practice a trailer tongue is placed on the towing ball member mounted on the drawbar of a towing vehicle. The towing ball member consists of a pin with a ball head inserted into a hole in the drawbar and secured thereto by a fastener. The main problem with this design is the instability of the hitch when subjected to dips and bumps while driving along rough terrain. Due to the fact that the trailer is being pulled by the towing vehicle, the former comes into contact with the uneven terrain after the towing vehicle has already reacted to it; therefore working to oppose the motion of the latter. Thus, as the towing vehicle is in motion the pin is subjected to various forces resulting from the slackness present between the pin and the drawbar. Very frequently the pin breaks due to the concentration of forces on the pin. Not only is this an inconvenience to the driver of the vehicle but it is also a cause for numerous trailer accidents each year.

The conventional towing hitch presently employed is unstable, unreliable and potentially hazardous to use. Consequently, it is desired to improve the rigidity while maintaining the versatility of the towing hitch in order to ensure that it is functional and securable under most road conditions. What is currently not available is a hitch assembly, propitiously suited for rigid attachment to a drawbar of a towing vehicle with a pin slot that is easily installable yet versatile and provides the stability required to make an effective towing hitch.

SUMMARY OF THE INVENTION

In accordance with a general aspect of the present invention there is provided a hitch assembly for attachment to a drawbar of a towing vehicle with a pin slot, comprising: a mounting bracket defining a horizontal through adapted to receive the drawbar, a pin projecting downwards into the through for engagement in the pin slot, a wedge axially insertable into the through for wedging the drawbar in the through, and a fastener for releasably securing the wedge to the mounting bracket.

In accordance with a further aspect of the present invention, there is provided a method for installing a hitch assembly for attachment to a drawbar of a towing vehicle with a pin slot, the method comprising the steps of: fitting a mounting bracket over the drawbar with a pin projecting inwardly from the mounting bracket in engagement with the pin slot, and wedging the drawbar in place within said mounting bracket.

In accordance with a further general aspect of the present invention, there is provided a hitch assembly mountable to a drawbar of a towing vehicle for towing a steerable trailer, comprising a mounting bracket carrying a towing ball member and adapted to be releasably securely mounted to the drawbar, a trailer steering mechanism engaging member extending outwardly from said mounting bracket for communicating steering movements from the towing vehicle to the steerable trailer.

These and other aspects and advantages of the invention will become more apparent from the following detailed description when taken in conjunction with the accompanying drawings.

BRIEF DESCRIPTION OF THE DRAWINGS

Having thus generally described the nature of the invention, reference will now be made to the accompanying drawings, showing by way of illustration a preferred embodiment thereof and in which.

DETAILED DESCRIPTION OF PREFERRED EMBODIMENTS

Figure 1:
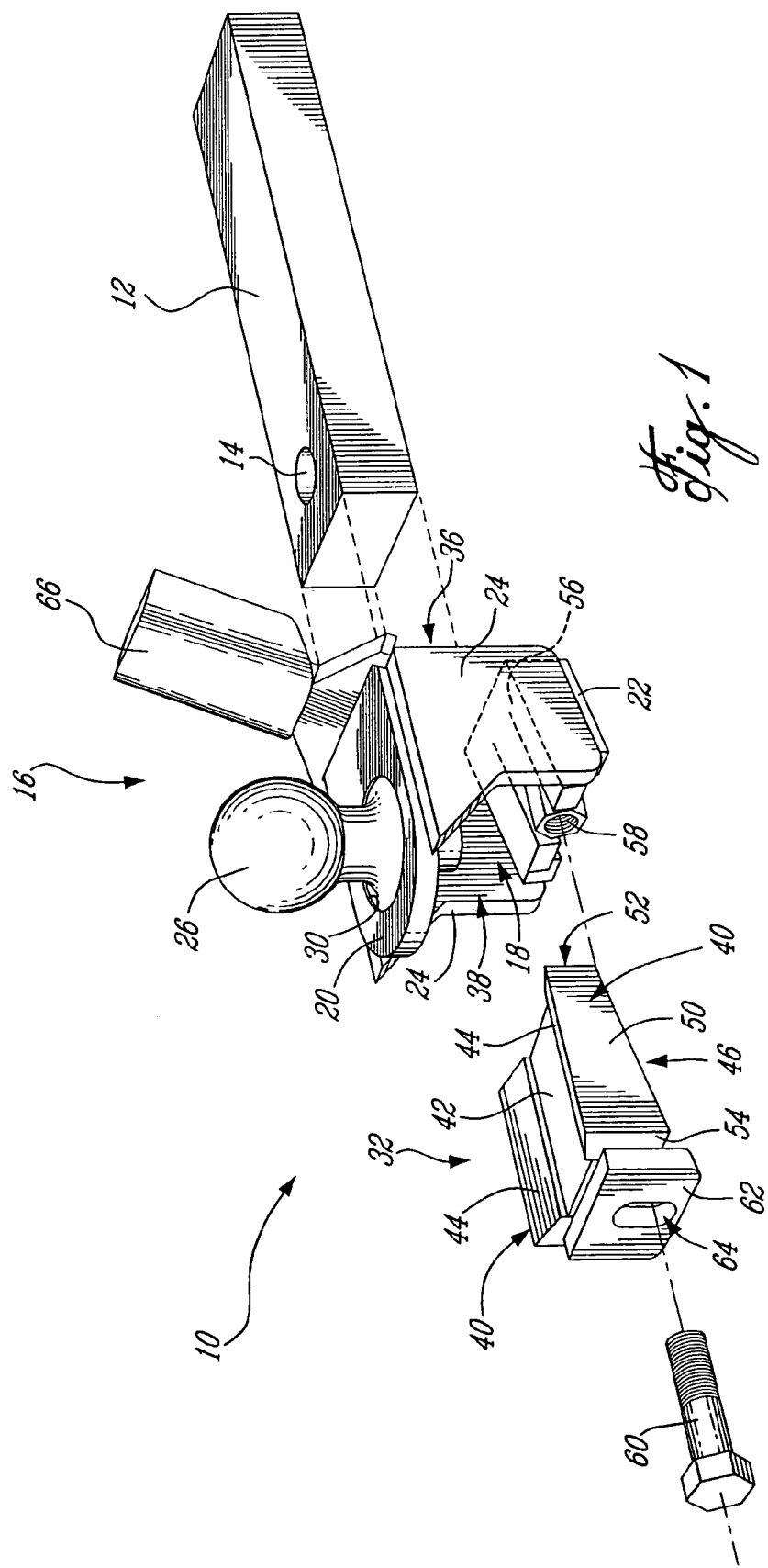
FIG. 1 is a perspective view of a hitch assembly adapted to be mounted on a drawbar of a towing vehicle, in accordance with a preferred embodiment of the present invention.

Referring to the drawings and particularly to FIG. 1, a hitch assembly in accordance with an embodiment of the present invention is shown at 10. A drawbar 12 of a towing vehicle with a pin slot 14 is also shown, whereby the hitch assembly 10 may be mounted thereto by any convenient manner. The hitch assembly 10 comprises a mounting bracket 16 defining a horizontal through 18 for receiving the drawbar 12. As a preferred embodiment of this invention, the horizontal through 18 is defined more specifically by a top portion 20, a bottom portion 22 and two side portions 24 making up the core structure of the mounting bracket 16. Particularly the top, base and side portions, 20, 22, and 24 respectively are prismatically moulded together such that they define a horizontal through able to receive a drawbar 12 of varying height and width.

Figure 2:
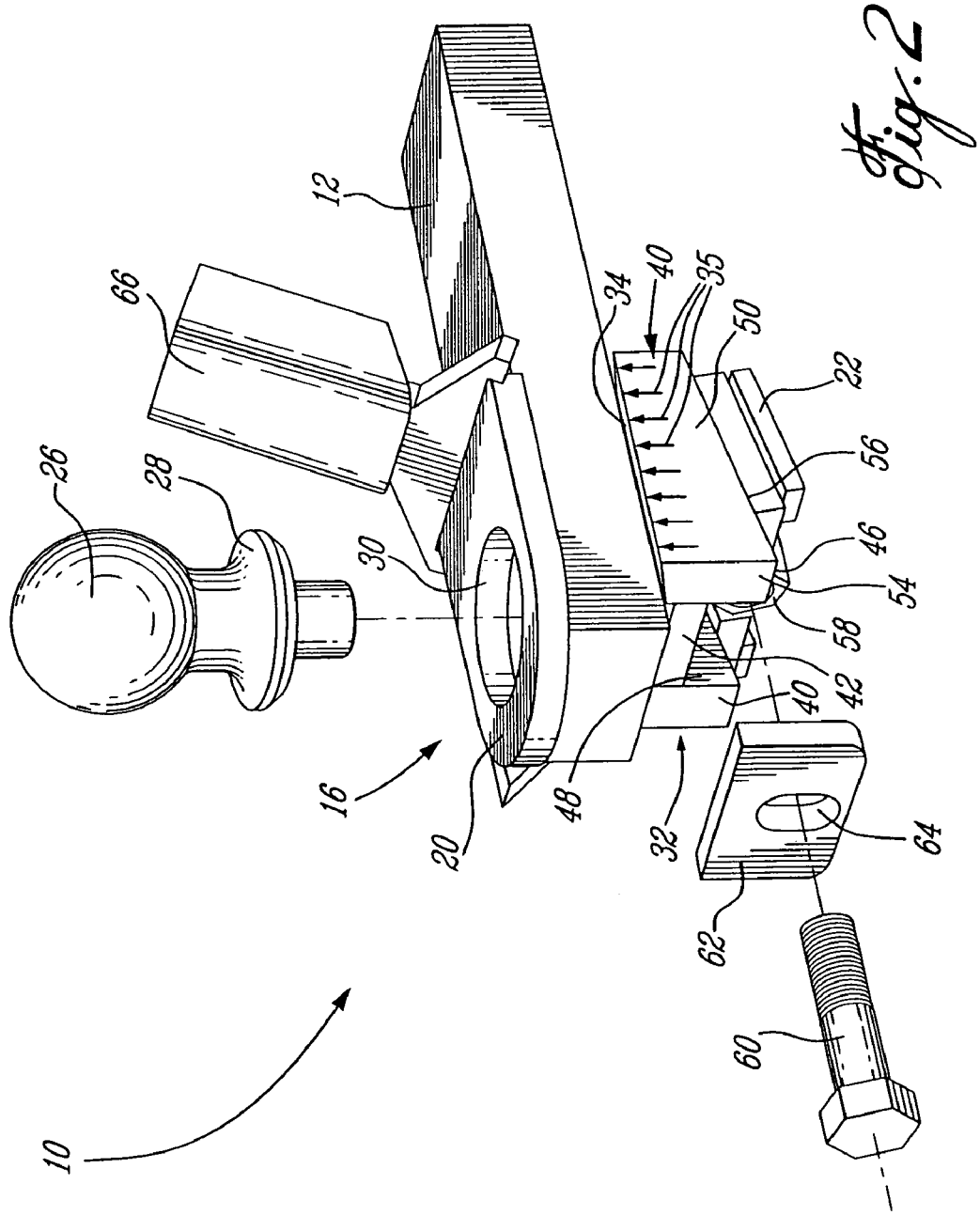
FIG. 2 is an exploded view of a hitch assembly mounted on a drawbar of a towing vehicle.

Referring now to FIG. 2, the hitch assembly 10 also comprises a pin 26 for engagement in the pin slot 14 of the drawbar 12. Preferably, the pin 26 is an integral part of the mounting bracket 16 so that the hitch assembly 10 is rigid. Thus, the rigidity of the hitch assembly 10 is one factor which contributes to reduce the concentration of forces on the pin 26 when the towing vehicle is in motion, resulting in less pin breakages than with the hitch assembly described in the prior art. In the present embodiment, the pin 26 is integrally joined to the top portion 20 projecting downwards into the horizontal through 18 for engagement in the pin slot 14 of the drawbar 12. The pin 26 has a tapered skirt 28, which fits into a complementary tapered aperture 30 defined through the top portion 20 of the mounting bracket 16. The pin 26 is permanently secured in the aperture 30, such as by welding or other thermal fusion processes. As a result, the slackness present in the hitch assembly described in the prior art is eliminated by securely fitting the pin 26 to the mounting bracket 16.

Figure 3:
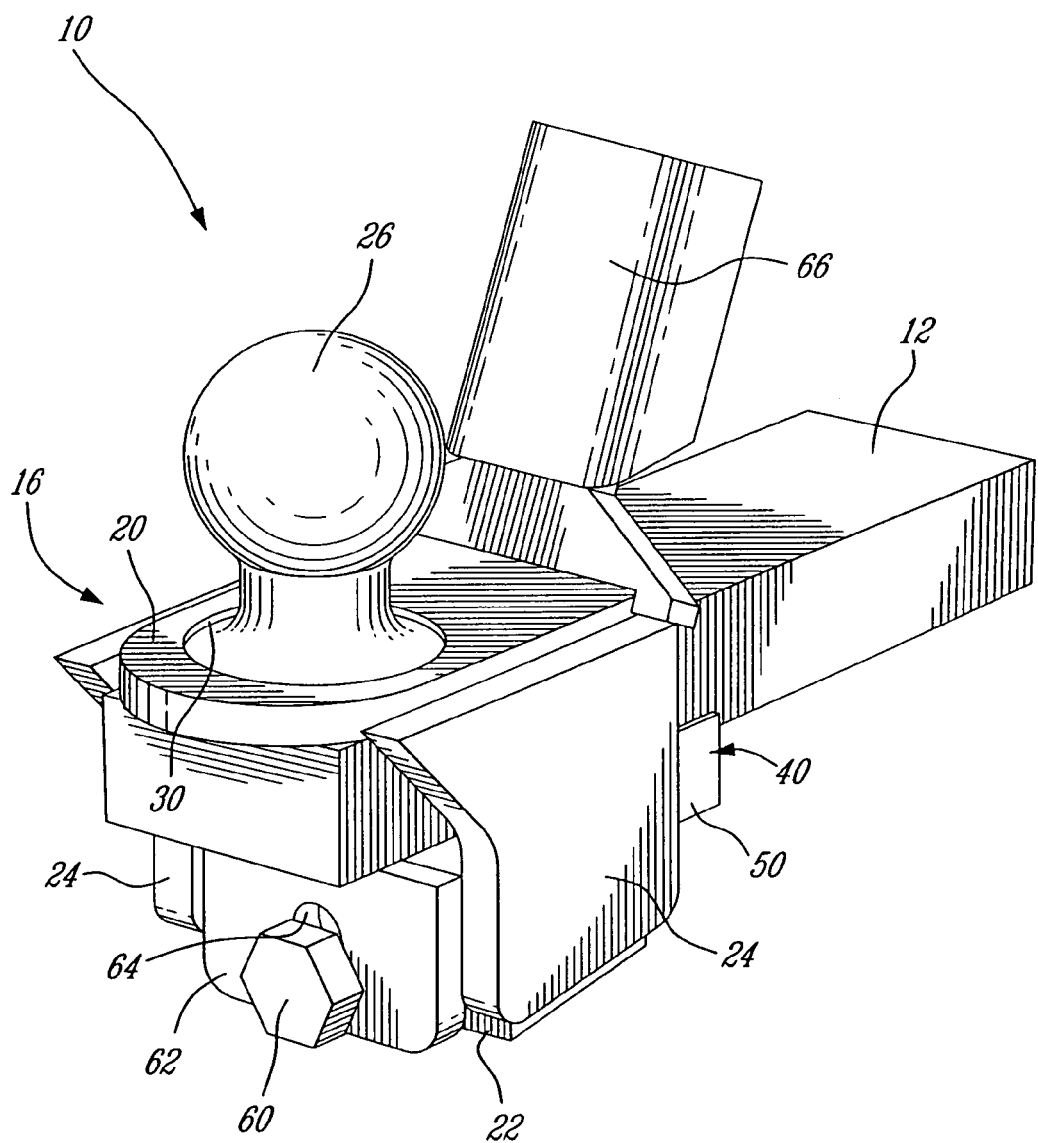
FIG. 3 is a perspective view of a hitch assembly mounted on a drawbar of a towing vehicle and secured thereto.

In addition, the hitch assembly 10 further comprises a wedge 32 axially insertable into the horizontal through 18 for wedging the drawbar 12 therein, as shown in FIGS. 2 and 3. Preferably, the wedge 32 is insertable between the drawbar 12 and the base portion 22 of the mounting bracket 16 such that there is a uniform contact surface 34 (FIG. 2) between the wedge 32 and the drawbar 12 whereby uniform pressure is applied thereto, as depicted by arrows 35 in FIG. 2. Notably, the wedge 32 can be inserted into the through 18 of the mounting bracket 16 by the same or opposing horizontal entrance as the entrance by which the drawbar 12 was received; however the invention will be described from hereon as presented in the accompanying drawings, with the insertion of the wedge 32 opposing that of the drawbar 12. Moreover, for further clarification, the entrance receiving the drawbar 12 will be referred to from hereon as the front entrance 36 while the entrance receiving the wedge 32 will be referred to from hereon as the rear entrance 38 (see FIG. 1).

Advantageously, the present invention is characterized by its versatility in that it is adaptable for a drawbar 12 of varying thickness and width. More specifically, the wedge 32 in combination with the base portion 22 of the mounting bracket 16 allows for the drawbar 12 to vary in thickness, and the structural integrity of the wedge 32 allows for the drawbar 12 to vary in width.

In a preferred embodiment of this invention, the wedge 32 is composed of two side segments 40 separated by a flat horizontal segment 42, as shown concurrently in FIGS. 1 and 2. The side segments 40 are each polyhedrons including six facets: rectangular top and bottom facets 44 and 46, polygonal inner and outer side facets 48 and 50, and polygonal front and rear facets 52 and 54 respectively. Preferably, the flat horizontal segment 42 separates the inner, polygonal, side facets 48 and is moulded thereto to maintain the structural integrity of the wedge 32. Alternatively, the wedge could be molded from a single piece of material.

Furthermore, referring concurrently to FIGS. 1 and 2, the rectangular top facets 44 are sloped inwards, towards the flat horizontal segment 42, enabling the wedge 32 to accept a drawbar 12 of varying width. Thus, the contact surface 34 between the wedge 32 and the drawbar 12, as abovementioned and best illustrated in FIG. 2, can develop anywhere along the slope of top facets 44 depending on the width of the drawbar 12. As the width of the drawbar 12 increases, the contact surface 34 moves up the slope of the top facets 44 accordingly. Similarly, as the width of the drawbar 12 decreases, the contact surface 34 develops further down along the decline of the top facets 44. The bottom facets 46 differ from the top facets 44 by the manner in which they are sloped. The former are sloped to form the wedge shape such that the rear facets 54 are larger in surface area than the front facets 52. Suitably, the base portion 22 of the mounting bracket 16 adapted for receiving the bottom facets 46 of the side segments 40 can be described as having a corresponding sloped surface 56.

Moreover, the hitch assembly 10 comprises a fastener for releasably securing the wedge 32 to the mounting bracket 16. In one embodiment of the present invention the wedge 32 can be fastened by way of a nut 58 and a bolt 60 as illustrated in both FIGS. 1 and 2. The nut 58 is preferably integrally mounted to the base portion 22 of the mounting bracket 16, such as by welding. It is centrally located in the base portion 22 and aligned with the horizontal through 18 facing the rear entrance 38. It is understood that another form of threaded hole could be provided in the mounting bracket instead of the nut 58. Furthermore, the wedge 32 possesses a rear segment 62 adjacent to the rear facets 54 defining a slotted hole 64 for receiving the bolt 60 and securing the wedge 32 to the mounting bracket 16. The slotted hole 64 is aligned with the nut 58 and enables the bolt 60 to be inserted therein and attached to the nut 58 regardless of the position of the wedge relative to the drawbar 12 and the mounting bracket 16, as shown in FIG. 3.

As the wedge 32 is inserted by the rear entrance 38 into the horizontal through 18, the bottom facets 46 come into planar contact with the sloped surface 56 of the base portion 22 and the top facets 44 come into contact with the drawbar 12. By firmly wedging the drawbar 12 in the through 18 of the mounting bracket 16, the contact surface 34 between the wedge 32 and the drawbar 12 is formed uniformly along all the length of the top facets 44 ensuring that uniform pressure is applied to the drawbar 12. The position of the wedge 32 relative to the drawbar 12 and the mounting bracket 16 when wedged into the through 18 is based on the thickness of the drawbar 12: the smaller the thickness, the further the wedge 32 can be inserted into the through 18. Regardless of the position of the wedge 32, the pressure on the drawbar 12 remains uniform as long as it is firmly wedged into place.

Due to the abovementioned embodiments described hereof, the versatile hitch assembly 10 can be rigidly attached to the drawbar 12 ensuring its functionality in that uniform pressure is always applied thereto. This invention is as a result more stable due to the uniform pressure application, making it a more effective hitch assembly.

With concurrent reference to FIGS. 1, 2 and 3, the hitch assembly 10 depicted above will now be incorporated into the method proposed in an embodiment of the present invention. With the forgoing arrangement the hitch assembly 10 is manually attached to the drawbar 12 of a towing vehicle with a pin slot 14 by way of the following methodical steps. In carrying out this method, the drawbar 12 is placed into the front entrance 36 of the horizontal through 18 of the mounting bracket 16 and the projecting pin 26 is aligned with the pin slot 14. The pin 26 is then engaged into the pin slot 14 such that the mounting bracket 16 is resting on top of the drawbar 12.

As shown in FIGS. 1, 2 and 3, a trailer steering engaging member 66 extends upwardly forwardly from the top front portion of the bracket 36. The trailer steering engaging member 66 is adapted to be received between a pair of fork members (not shown) forming part of a pivotable member of a trailer steering mechanism. The engagement of the member 66 between the fork members provides for the transmission of motion from the motive vehicle to the trailer. When the motive vehicle turns to the left, the engagement of the member 66 between the fork members will impart a counterclockwise rotation of the pivotable member of the trailer steering mechanism. On the other hand, if the motive vehicle turns to the right, a clockwise rotation will be communicated to the pivotable member of the trailer steering mechanism by the member 66 through the fork members engaged therewith. This arrangement provides for a trailer steering mechanism which is responsive to the direction of movement of the motive vehicle.

Next, the wedge 32 is inserted into the rear entrance 38 of the horizontal through 18 so as to wedge the drawbar 12 into place. The wedge 32 is then secured to the mounting bracket 16 by passing the bolt 60 through the slotted hole 64 and fastening it to the nut 58. To ensure that the wedge 32 is firmly secured into place and applying uniform pressure to the drawbar 12, an axial force of any kind can be used to apply pressure to the wedge 32 in order to reposition it further into the through 18. An example of such a force could be the impact of hitting the rear segment 62 of the wedge 32 with a hammer. Finally, if required the wedge is further secured to the mounting bracket 16 by tightening the bolt 60.

The forgoing description of the preferred embodiments is considered as illustrative only of the principles of the invention. Further, changes and variations which are obvious to those skilled in the art are also included in the scope of this invention because it is not desired to limit the invention to the exact construction and method shown and described.

What is claimed is:

1. A hitch assembly for attachment to a drawbar of a towing vehicle with a pin slot, comprising:
   a mounting bracket defining a horizontal through adapted to receive the drawbar,
   a pin projecting downwards into the through for engagement in the pin slot;
   a wedge axially insertable into said through for wedging the drawbar in said through; and
   a fastener for releasably securing said wedge to said mounting bracket.

2. A hitch assembly according to claim 1, wherein said wedge is axially insertable between the drawbar and a portion of said mounting bracket such that said wedge is uniformly applying pressure to the drawbar.

3. A hitch assembly according to claim 2, wherein said mounting bracket is adapted for receiving a drawbar of varying height.

4. A hitch assembly according to claim 3, wherein said portion of said mounting bracket is sloped for receiving said wedge in planar contact therewith.

5. A hitch assembly according to claim 1, wherein said wedge is adapted for accepting a drawbar of varying width.

6. A hitch assembly according to claim 5, wherein said wedge includes at least two opposed slopping facets for applying uniform pressure to the drawbar.

7. A hitch assembly according to claim 1, wherein said fastener consisting of at least a nut and at least a bolt.

8. A hitch assembly according to claim 7, wherein said nut for receiving said bolt is integral to said mounting bracket.

9. A hitch assembly according to claim 8, wherein said wedge has a slotted hole adapted to be aligned with said nut of said mounting bracket for receiving said bolt.

10. A hitch assembly according to claim 1, wherein said pin is integral to said mounting bracket.

11. A hitch assembly according to claim 1, wherein said mounting bracket has a wedge bearing surface having a slope complimentary to that of said wedge.

12. A hitch assembly according to claim 1, wherein a trailer steering mechanism engaging member projects outwardly from said mounting bracket for communicating steering movements of the towing vehicle to a steerable trailer.

13. A method for installing a hitch assembly for attachment to a drawbar of a towing vehicle with a pin slot, the method comprising the steps of:
   a) fitting a mounting bracket over the drawbar with a pin projecting inwardly from the mounting bracket in engagement with the pin slot; and
   b) wedging the drawbar in place within said mounting bracket.

14. A method according to claim 13, wherein step b) comprises the step of providing a wedge, and axially inserting the wedge into the mounting bracket against the drawbar.

15. A method according to claim 14, further comprising the step of removably fastening the wedge to the mounting bracket.

16. A method according to claim 15, wherein the step of fastening the wedge to the mounting bracket is affected by tightening a bolt engaged in slot defined in the wedge into a threaded hole defined in the mounting bracket.

* * * * *